July 13, 1926.  
A. U. AVERA  
ELECTRICAL POWER TRANSMISSION  
Original Filed July 13, 1922   2 Sheets-Sheet 2

1,591,953

Patented July 13, 1926.

1,591,953

UNITED STATES PATENT OFFICE.

ARCH U. AVERA, OF FLORENCE, ALABAMA.

ELECTRICAL POWER TRANSMISSION.

Original application filed July 13, 1922, Serial No. 574,724. Divided and this application filed May 24, 1923. Serial No. 641,101.

My invention relates to the transmission of power to vehicles and has for its object the provision of means for permitting vehicles, such as busses, canal boats, or the like, to pass on the same side of a stationary source of power supply without interference, the present application being a division of my copending application, Serial No. 574,724, filed July 13, 1922.

Figure 1:
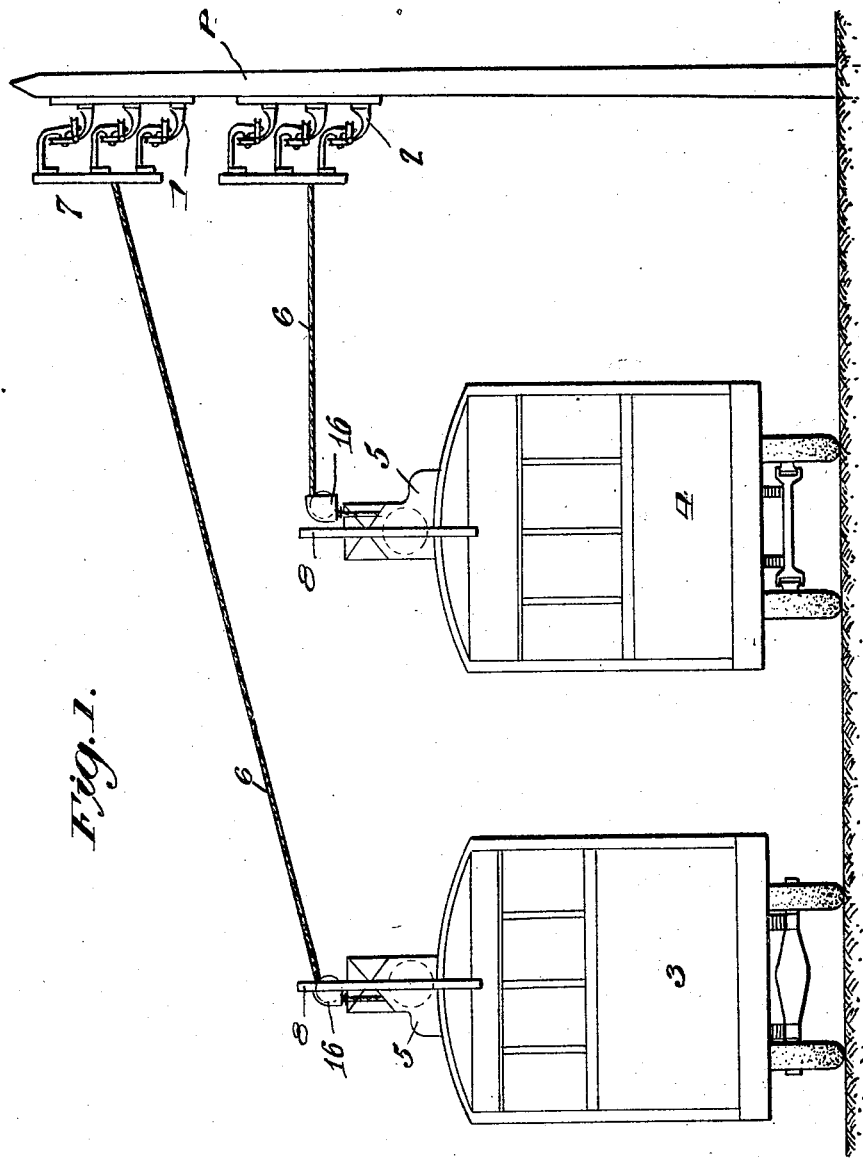
Figure 2:
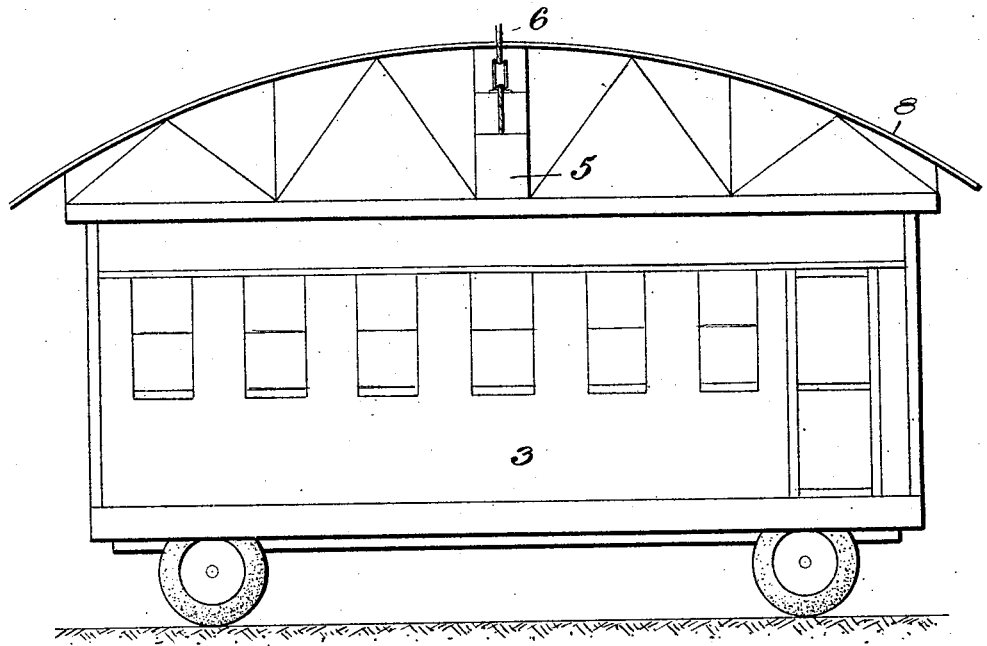

The invention is illustrated in the accompanying drawings, in which:

Fig. 1 is a diagrammatic view showing the invention applied to a system of trackless road vehicles; and Fig. 2 is a side view of one of the road vehicle.

Referring to the drawings in detail, the trolley conductors are strung along one side of the roadway or canal, as the case may be, on trolley poles P in upper and lower sets 1 and 2, respectively. The vehicles are here shown as road trucks 3 and 4, Fig. 1. Each vehicle carries a cable drum and motor housing 5, which contains within it, as indicated diagrammatically, a cable drum and motor arranged to exert a constant torque on the drum. A three-conductor cable 6 leads from the cable drum over a swivelled pulley 16 to the trolley carriage 7 where the conductor strands of the cable connect through trolley contact wheels with the trolley wires. The trolley carriages are supported on and guided by the trolley wires so as to trail along with the vehicle, the upper set of trolley wires being raised sufficiently above the lower set to permit two vehicles to pass in opposite directions without interference of the cables, as indicated in Fig. 1. To further guard against interference of the cables, each vehicle is provided with a cable guard 8 in the form of an arc-shaped ramp mounted on the top of the vehicle. These guards are so arranged that the one on the vehicle nearest the trolley poles will guide the cable of the far vehicle over the cable and motor housing of the near vehicle, should there be any sag in the cable of the far vehicle.

While I have herein illustrated and described a single specific embodiment of my invention for the sake of disclosure, it is to be understood that I do not limit myself to such specific form, but contemplate all such modifications and variants thereof as fairly fall within the scope of the appended claims.

Having thus described my invention, what I claim and desire to secure by Letters Patent is:

1. An electrical transportation system comprising a plurality of electrically driven vehicles, a roadway therefor, two sets of trolley power lines strung along one side of the roadway, one above the other, a current collector member for each car arranged to engage one of said trolley lines and adapted to move along the same and be supported thereby, and a flexible conductor cable connecting said collector with its vehicle, the collectors of vehicles travelling in opposite directions engaging with different trolley lines, together with means carried by each vehicle arranged to guard the superstructure of its vehicle from interference with the flexible conductor cable of a passing vehicle.

2. An electrical transportation system comprising a plurality of electrically driven vehicles, a roadway therefor, two sets of trolley power lines strung along one side of the roadway, one above the other, a current collector member for each car arranged to engage one of said trolley lines and adapted to move along the same and be supported thereby, and a flexible conductor cable connecting said collector with its vehicle, the collectors of vehicles travelling in opposite directions engaging with different trolley lines, together with a guarding ramp carried by each vehicle arranged to guard the superstructure of its vehicle from interference with the flexible conductor cable of a passing vehicle.

In testimony whereof I hereunto affix my signature.

ARCH U. AVERA.